United States Patent [19]

Washizu

[11] Patent Number: 4,895,396

[45] Date of Patent: Jan. 23, 1990

[54] CONNECTOR FOR CONNECTING SMALL DIAMETER PIPE

[75] Inventor: Katsushi Washizu, Sunto, Japan

[73] Assignee: Usui Kokusai Sangyo Kaisha Ltd., Shizuoka, Japan

[21] Appl. No.: 319,254

[22] Filed: Mar. 3, 1989

[30] Foreign Application Priority Data

Mar. 8, 1988 [JP] Japan .............................. 63-30865[U]

[51] Int. Cl.$^4$ ............................................. F16L 35/00
[52] U.S. Cl. ..................................... 285/93; 285/319; 285/351
[58] Field of Search ........................... 285/93, 319, 351

[56] References Cited

U.S. PATENT DOCUMENTS

| | | | |
|---|---|---|---|
| 3,933,378 | 1/1976 | Sandford et al. | 285/319 |
| 4,637,640 | 1/1987 | Fournier | 285/319 |
| 4,681,351 | 7/1967 | Bartholomew | 285/319 |
| 4,749,214 | 7/1988 | Hoskins et al. | 285/319 |
| 4,753,458 | 6/1988 | Case et al. | 285/93 |

*Primary Examiner*—Dave W. Arola
*Attorney, Agent, or Firm*—Anthony J. Casella; Gerald E. Hespos

[57] ABSTRACT

A connector for connecting a small diameter pipe has a connector body internally formed with stepped small and large diameter chambers. a bush sustains sealing members in the small diameter chamber. A socket includes a pawl-like walls engaging with a pipe annular swelling wall in a completely installed state of the pipe. The connector further includes a confirmative member having confirmative portions composed of a pair of flexible arms. The arms are pressed and expanded by the top of pipe swelling wall when the pipe is properly set, thereby making the confirmative portions more protrudent than slots perforated in the peripheral wall of the enlarged diameter chamber.

5 Claims, 2 Drawing Sheets

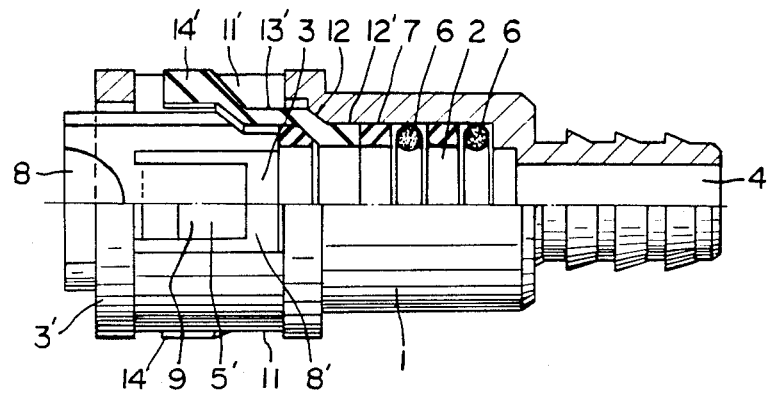
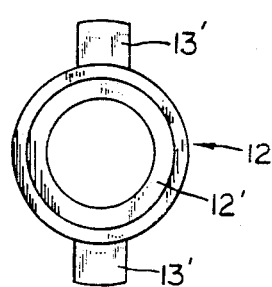
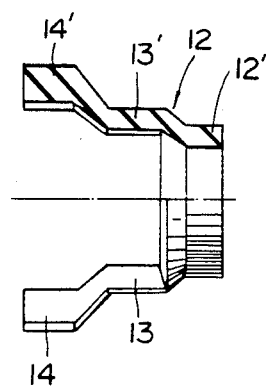
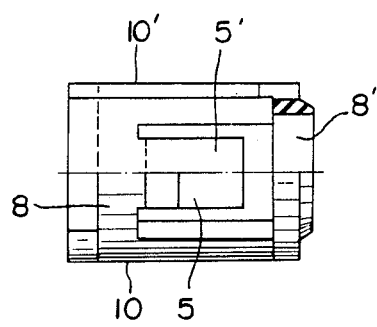
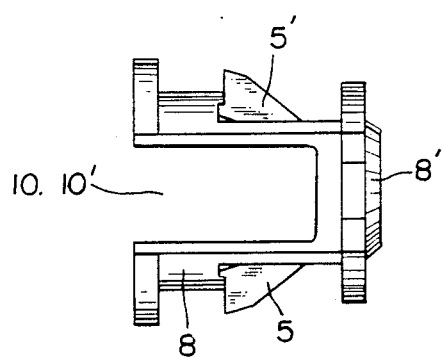

CONNECTOR FOR CONNECTING SMALL DIAMETER PIPE

BACKGROUND OF THE INVENTION:

1. Field of the Invention:

The present invention is directed to an improvement of structure of a connector for connecting a metallic pipe or a resinous tube (hereinafter simply referred to as a pipe) having a relatively small diameter of 20 m/m or less which is disposed as a supply passageway for supplying oil or air generally to automobiles or a variety of machinery and equipment.

2. Description of the Prior Art:

This type of conventional connector for connecting a pipe is typically constructed in the following way. The connector comprises a connector body having its axial core interior formed with a stepped small diameter chamber communicating with a communication hole provide don the top side thereof and with an enlarged diameter chamber including a hanging wall shaped on its rear end peripheral waall. In the enlarged diameter chamber, a socket member formed with a pipe installing hole at its top portion and provided with protrudent pawl-like walls each inclined forwards is set in resilient circular cut-walls so split by right and left slits as to fce each other. The pawl-like walls engage securely with slot-like engagement holes perforated in the peripheral wall of the enlarged diameter chamber of the connector body. An annular swelling wall shaped on the connecting side of the pipe is arranged to engage securely with an inner peripheral end surface of the socket member installing hole within the enlarged diameter chamber. In such a connected state, the connection is effected so that the tip portions of the pawl-like walls are permitted to impinge upon the swelling wall.

The foregoing prior art is, however, attended with the following problems. The pawl-like walls of the socket member having the pair of pawl-like walls each inclined to its top are tightly engaged with the engagement holes perforated in the peripheral wall of the enlarged diameter chamber of the connector body. This arrangement presents a difficulty in confirming from outside whether the installed condition is proper or improper in such a state that the pipe swelling wall is attached to the axial core interior of the connector body.

This further causes incomplete insertion on the connecting side of the pipe due to the ill-installed condition or a careless operation. It is an oft-happened situation where the tip portions of pawl-like walls are positioned in front of the annular swelling wall, or alternatively the installation is performed while the tip portions run on the swelling wall. As a result, a leakage or separation associated with incomplete insertion on the connection side takes place due to an oscillatory state.

SUMMARY OF THE INVENTION

It is a primary object of the present invention which is made to obviate the foregoing problems inherent in the prior art to provide a connector for connecting a small diameter pipe which is capable of confirming from outside a proper installed condition of a pipe and keeping a secure connection without accident such as a leakage or separation when being set in place for use.

To this end, according to one aspect of the invention, there is provided a connector for connecting a small diameter pipe, comprising: a connector body having its axial core interior formed with a stepped small diameter chamber communicating with a communication hole provided on the top side thereof and with a stepped enlarged diameter chamber disposed in rear of said small diameter chamber and having its rear end peripheral wall serving as a hanging wall; sealing members accommodated in the small diameter chamber; a bush inserted behind the sealing members; and a socket member formed with a pipe installing hole at its top portion and pawl-like walls each inclined forwards, the socket member being housed in a space frame defined by resilient circular cut-walls so split by right and left slits as to face to each other within the enlarged diameter chamber, the pawl-like tip portions capable of resiliently engaging with an annular outwardly-swelling wall shaped on the connecting side of the pipe in a state where the pawl-like walls are securely fitted in slot-like engagement holes perforated in the peripheral wall of the enlarged diameter chamber of the connector body, and the annular swelling wall engages with an inside hole peripheral end surface of the installing hole of the socket member within the enlarged diameter chamber, characterized by an open confirmative member including confirmative portions consisting of a pair of face-to-face flexible arms provided behiind an annular member, the flexible arms being forced to fit in face-to-face slots separatelyso perforated in the peripheral wall of the enlarged diameter chamber of the connector body as to be substantially orthogonal to a pair of engagement holes in which the socket pawl-like walls are fitted, wherein when the pine is adequately installed the confirmataive unit is made more protrudent than the slots by outwardly expanding the flexible arms formed at the proximal ends of the confirmative portions with the top portion of the pipe swelling wall.

According to the present invention having such a constitution, fitted in the face-to-face slots separatedly perforated in the peripheral wall of the connector body is the confirmative member including confirmative portions consisting of the pair of face-to-face flexible arms disposed behind the annular member attached to the top portion of the confirmative member. Base don this construction, where the pipe is housed in the axial core interior of the connector body, the flexible arms are expanded outwardly by pressing in a well-installed state, i.e., when the pipe swelling wall presses the proximal ends of the confirmative portions. The confirmative portions are thereby made more protrudent than theslots. Thus, it is possible to redily confirm from outside whether or not the pipe is properly installed in the enlarged diameter chamber.

BRIEF DESCRIPTION OF THE DRAWINGS

Other objects and advantages of the invention will become more apparent during the following discussion in conjunction with the accompanying drawings, in which:

FIG. 1 is a partially cut-away sectional view of a connector for connecting a small diameter pipe, showing one embodiment of the present invention;

FIG. 2 is a front elevation depicting a confirmative member of FIG. 1;

FIG. 3 is a partially cut-away sectional view of FIG. 2;

FIG. 4 is a partially cut-away view in section, depicting a socket member of FIG. 1;

FIG. 5 is a side view of FIG. 4; and

DETAILED DESCRIPTION OF THE PREFERRED EMBODIMENTS

Figure 6:
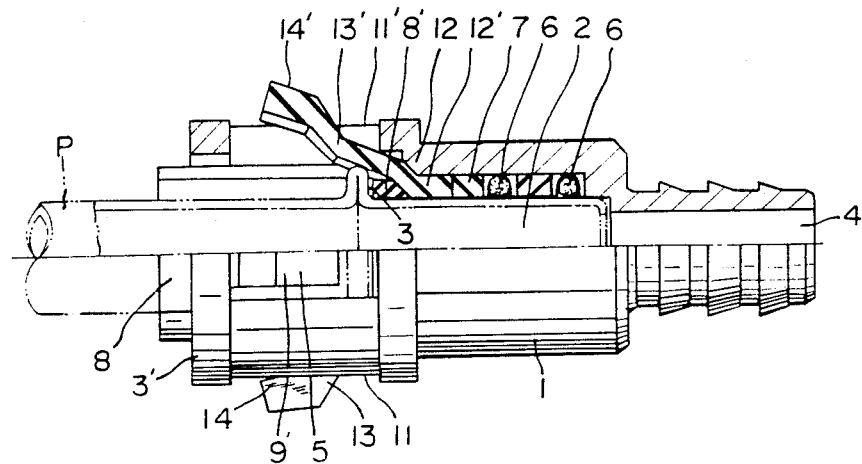
FIG. 6 is a view of assistance in explaining a well-incorporated state of the pipe.

Throughout the drawings, the reference numeral (1) designates a metallic or resinous connector body having its axial core interior formed with a stepped small diameter chamber (2) communicating with a communication hole (4) including a connecting wall such as a resinous tube or a rubber hose (not illustrated) provided at its top portion and with a stepped enlarged diameter chamber (3) disposed behind chamber (2), chamber (3) having its rear end peripheral wall serving as a hanging wall (3'). The numeral (6) represents a sealing member formed of an elastic material like rubber. A spacer is interposed between sealing members (6) accommodated in small diameter chamber (2). A bush (7) disposed in rear of the sealing members is fitted to the inside of the small diameter chamber (2). A socket member generally indicated at (8) formed of a metallic spring material or resinous material. Within enlarge diameter chamber (3), set in a space frame defined by resilient circular cut-walls so split by right and left slits (10, 10') as to stand vis-a-vis with each other is socket member (8) formed with an installing hole (8') for a pipe (P) like a metallic pipe or a resinous tube at the top portion thereof and also provided with protrudent pawl-like walls (5, 5') each inclined forwards.

Pipe (P) is installed by engaging an annular outwardly-swelling wall shaped on the connecting side thereof with an inner hole peripheral end surface of installing hole (8') of socket member (8) within the enlarged diameter chamber. In this state, the tip portions of pawl-like walls (5, 5') are forced to resiliently engage with the swelling wall, and at the same time pawl-like walls (5, 5') are securely fitted in slot-like engagement holes (9, 9') perforated in the peripheral wall of enlarged diameter chamber (3) of connector body (1), thus performing the installation. Face-to-face slots (11, 11') are so perforated in the peripheral wall of enlarged diameter chamber (3) of connector body (1) as to be substantially orthogonal to the pair of engagement holes (9, 9') with which pawl-like walls (5, 5') of socket member (8) engage. Disposed behind an annular member (12') is an open confirmative member (12) which is made of a resinous material or rubber and includes confirmative portions (14, 14') consisting of a pair of face-to-face flexible arms. Confirmative member (12) maybe constituted so that the top portion thereof serves as bush (7), or may separately be constituted with annular member (12) attached to the top portion thereof. The flexible arms are set in the above-described slots. In this way, when pipe (P) is properly secured to the axial core interior of connector body (1), the top portion of the annular swelling wall shaped on the connecting side of the pipe acts to press flexible arms (13, 13') provided at the substantially proximal ends of confirmative portions (14, 14'). Subsequently, flexible arms (13, 13') are expanded outwardly by the foregoing pressing force, and confirmative portions (14, 14') are thereby made more protrudent than slots (11, 11'). It is therefore feasible to certainly see from outside if the installed condition within enlarged diameter chamber (3) is proper or improper, depending on whether the protrusion appears or not.

Figure 7:
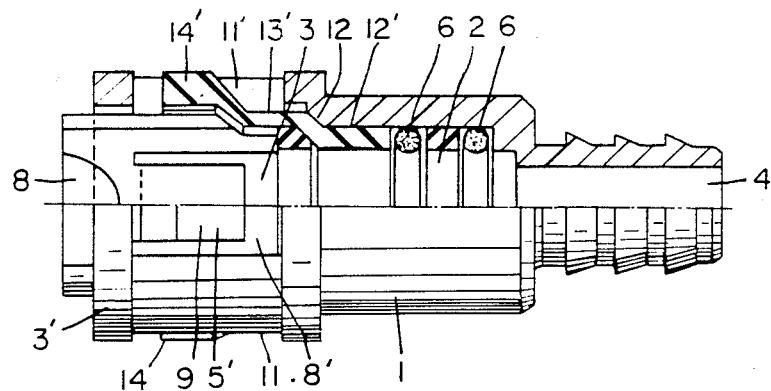
FIG. 7 is a partially cut-away sectional view of a modification of the present invention.

Note that in the illustrations of the aforementioned embodiments, the insertion is effected wherein the top portion of confirmative member is shaped separately from bush (7). Alternatively, as shown in FIG. 7, the top portion of confirmative member may be shaped integrally with the bush (7).

As discussed above, the connector according to the present invention is arranged such that flexible arms (13, 13') of confirmative member (12) are fitted in face-to-face slots (11, 11') separately perforated in the peripheral wall of connector body (1). When pipe (P) is properly installed, it is possible to readily confirm from outside whether the installed condition is adequate or inadequate by detecting that confirmative portions (14, 14') are protruded from slots (11, 11'). Even when being installed under an oscillatory condition, the secure connection can be maintaned with no accident such as a leakage or separation on the connecting side. The remarkably useful connector for connecting the small diameter pipe is thus provided.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A connector for connecting a small diameter pipe, said pipe having an end and an annular swelling spaced from said end, said annular swelling having opposed sides, said connector comprising:

a connector body having opposed first and second ends and an axial hollow core interior extending therebetween, portions of the axial core interior adjacent the first end of the connector body defining a communication hole, a stepped small diameter chamber defining a portion of the axial core interior intermediate the first and second ends of the connector body and communicating with the communication hole and a stepped enlarged diameter chamber defining a portion of the axial core interior and disposed between said small diameter chamber and the second end of the connector body, the enlarged diameter chamber including a pair of engagement holes perforated in its peripheral wall at opposed locations thereon and a pair of slots perforated in the peripheral wall at opposed locations thereon, said slots being disposed substantially orthogonal to the engagement holes;

sealing members attached to the inside of said small diameter chamber;

a bush so fitted as to sustain said sealing members within said small diameter chamber;

a socket member provided with pawl-like walls having tip portions resiliently engageable with the side of said annular swelling opposite said pipe end of the pipe when said annular swelling has passed said tip portions and said pipe has been completely installed, the pawl-like walls of said socket member further being engageable with said engagement holes for securely retaining the pipe in the connector body; and a confirmative member having an annular portion and a pair of flexible arms extending from the annular portion at substantially opposed locations thereon, said confirmative member and said socket member provided with coacting abutting surfaces whereby said socket member retains said confirmative member within said connector body, said confirmative member being disposed in the connector body such that the flexible arms are generally aligned with the slots of the connector body, the flexible arms being configured to be engaged by the annular swelling of the pipe and to be flexed outwardly through said slots and beyond the peripheral wall of the connector body, whereby protrusion of the flexible arms of said confirmative member beyond the peripheral wall of the connector body provides confirmation of complete insertion of the pipe, and whereby the orthogonal alignment of the slots and the engagement holes of the connector body enable outward flexing of the arms of the confirmative member independent of the socket member.

2. The connector as set forth in claim 1, wherein said bush and said confirmative member are formed into one united body.

3. The connector as set forth in claim 1, wherein said confirmative member is formed of a resinous material.

4. The connector as set forth in claim 1, wherein a spacer is interposed between said plurality of sealing members.

5. The connector as set forth in claim 1 wherein said confirmative member is formed from rubber.

* * * * *